(12) United States Patent
Gloss et al.

(10) Patent No.: US 11,096,257 B2
(45) Date of Patent: Aug. 17, 2021

(54) VEHICLE LIGHTING DEVICE, IN PARTICULAR A VEHICLE COMBINED LIGHTING DEVICE

(71) Applicant: Varroc Lighting Systems, s.r.o., Senov u Noveho Jicina (CZ)

(72) Inventors: Tomas Gloss, Vitkov (CZ); Petr Novak, Senov u Nového Jicina (CZ); Ludek Mazal, Tisek (CZ)

(73) Assignee: VARROC LIGHTING SYSTEMS, S.R.O.

( * ) Notice: Subject to any disclaimer, the term of this patent is extended or adjusted under 35 U.S.C. 154(b) by 0 days.

(21) Appl. No.: 16/896,277

(22) Filed: Jun. 9, 2020

(65) Prior Publication Data

US 2020/0413515 A1 Dec. 31, 2020

(30) Foreign Application Priority Data

Jun. 25, 2019 (CZ) .................................. CZ2019-415

(51) Int. Cl.
*H05B 45/46* (2020.01)
*H05B 45/20* (2020.01)
*B60Q 3/74* (2017.01)

(52) U.S. Cl.
CPC .............. *H05B 45/46* (2020.01); *B60Q 3/745* (2017.02); *H05B 45/20* (2020.01)

(58) Field of Classification Search
CPC ......... H05B 45/46; H05B 45/20; B60Q 3/745
See application file for complete search history.

(56) References Cited

U.S. PATENT DOCUMENTS

| | | | |
|---|---|---|---|
| 7,683,861 B2 | 3/2010 | Scilla | ............................. 345/76 |
| 2015/0201475 A1 | 7/2015 | Yin | |

FOREIGN PATENT DOCUMENTS

| | | |
|---|---|---|
| DE | 10 2006 021 694 A1 | 11/2007 |
| WO | WO 2018/065247 A1 | 4/2018 |

*Primary Examiner* — Joseph L Williams
(74) *Attorney, Agent, or Firm* — Ostrolenk Faber LLP

(57) ABSTRACT

A vehicle lighting device, in particular of a vehicle combined lighting device, including at least two controllable light modules with point light sources with automotive certification, which are connected to a power source and to a control unit. Each light module includes a driver to which point light sources of the light module are connected, wherein the drivers are connected by their data input via a common data-conducting path of the lighting device to a common control unit and are further connected by their electrical terminals to a two-wire common power distribution system from the source of electrical energy, wherein each point light source is connected to the power output of its driver and to a negative pole of the source of electrical energy or to a grounding pole. A light module for a vehicle lighting device, in particular for a vehicle combined lighting device.

10 Claims, 3 Drawing Sheets

VEHICLE LIGHTING DEVICE, IN PARTICULAR A VEHICLE COMBINED LIGHTING DEVICE

TECHNICAL FIELD

The invention relates to the field of an arrangement of a lighting device of a motor vehicle comprising a plurality of point light sources, formed, for example, by LEDs or laser diodes.

The invention also falls within the field of light modules for lighting devices of motor vehicles.

BACKGROUND ART

The supply of electrical energy is a basic prerequisite for light emission by signaling or lighting devices. Electrical energy is supplied to a light source via an electrically conductive circuit or by connecting various electrical elements which form an electrically conductive path and perform functions required from an electrical circuit. In the case of the supply of electrical energy to light sources formed by LEDs, conductive paths are usually embedded in the carrier of these LEDs, for example in a printed circuit board (PCB). If it is necessary to shape the electrically conductive path in space, flexible printed circuits, for example, are used as conductive paths.

U.S. Pat. No. 7,683,861 discloses an arrangement for controlling general RGB LEDs, in which the light source is coupled to a power supply unit by a power cable and then by three data cables transmitting to the RGB LEDs control information about the required brightness and color of the RGB LEDs output light. Each RGB LED has its own processor which controls the operation of each of the three basic RGB LED color channels based on the data transmitted.

The advantage of this arrangement is a certain reduction in the number of wires for controlling the light source. On the other hand, the number of these conductors is still larger than is suitable for automotive lighting, and so is the large amount of control information for the RGB LEDs. The same is true about the solution known from US 2015/0201475.

WO 2018/065247 discloses a device for long distance optical communication, where a control electronic circuit is formed on a common substrate together with an LED and both elements are functionally interconnected, whereby the electronic circuit is provided with means for modulating the output light of the connected LED so that this output light transmits data. Typical uses include data links in intelligent buildings or between buildings, etc., where it is necessary to achieve high transmission speeds and transmission reliability.

Also known from the background art are individual solutions in which light source manufacturers integrate a separate processor/driver for LED control into a light source housing, whereby the LED is also mounted in the housing. Such an individually designed lighting device can then be connected to a common power distribution system and to a control system, nevertheless, the disadvantage of these individual solutions consists in increase of costs and the unavailability of such light sources in the necessary range of variants and types usable in the automotive industry, i.e. such sources do not have the so-called automotive certification, in particular they have low light output, short service life and insufficient reliability.

DE 10 2006 021 694 describes a lighting device for motor vehicles which comprises an assembly of light modules comprising LEDs. The individual modules can be controlled separately in order to achieve different volume of illuminated space while maintaining the purpose of the lighting function, which is generating different passing or driving beam or other front, rear or side light of the vehicle according to the type of environment in which the vehicle is currently moving. For example, in urban or built-up and densely populated areas, the generated low beam will illuminate a shorter but wider space in front of the vehicle, as the vehicle usually moves at a lower speed and there are often pedestrians and other phenomena on the sides in front of the vehicle. On the motorway, on the other hand, where the vehicle moves at a higher speed and where, for example, the movement of pedestrians along the edge of the roadway is usually prohibited by law, the generated low beam, i.e. the light of the same light function as in the previous sentence about the city, will illuminate a longer and narrower space in front of the vehicle. In the case of the high beam, the situation is similar when the device according to DE 10 2006 021 694 selectively adjusts the volume of the generated driving beam according to the environment in which the vehicle is currently moving. According to DE 10 2006 021 694, the selective adjustment of the volume of the generated light is performed in such a manner that the LED modules are connected to a control device which selectively switches on or off the individual LED modules so that the required generated light function of the driving beam or passing beam is optimized, or variable, e.g., according to the external environment of the vehicle. In addition, the control device according to DE 10 2006 021 694 comprises a first separate control unit and an integrated second control unit, whereby both control units communicate via a communication bus. The first control unit transmits only control information regarding the type of light to be generated (long narrow, short wide, etc.) and the second control unit processes this control information into control parameters needed to generate the indicated light. Power supply of at least part of the light modules is realized via the control device.

The drawback of this solution is the complexity and the power supply of the LED modules via the control device, which increases not only the probability of failure, but also the cost of this solution for real application. Other disadvantages include its single purpose and low variability in terms of the number of light functions generated.

The disadvantage of the background art in the field of automotive lighting is that in order to create a sufficiently variable lighting device which also meets the very strict criteria of the automotive industry, its corresponding standards and safety regulations, it is necessary to use a light source, such as an LED, with the so-called automotive certification and to supply separately power supply to each such light source or system of light sources forming one common light module by separate cabling for the supply of electrical energy, usually in the form of anode and cathode conductor (wire). In the case of light elements with control, it is then necessary to bring a separate control/data cable to each light source or light module. Wiring comprising at least three conductors must therefore lead to each light source or to each light source module, for example for a group of 10 automotive LEDs it is a minimum of 11 conductors. In that case, the individual components of the vehicle lighting device often cannot be spatially arranged in such a way that all required light sources are interconnected/connected via such a large number of cables.

The object of the invention is to eliminate or at least reduce the disadvantages of the background art and achieve the desired functionality, variability of lighting functions, radiating characteristics of the lighting device as a whole, etc., while arranging light sources within a predetermined limited space and using simple "three-wire" cabling for the whole lighting device, i.e. for all the light sources of the lighting device. Furthermore, a partial object of the invention is to make it possible to easily and efficiently combine different light sources or different groups of light sources in one vehicle lighting device in order to control the variability of the lighting functions of the lighting device, while always meeting the technical specifications and legal requirements for the use of lighting devices in automotive operation and, in addition, with acceptable financial costs for production, operation and maintenance.

PRINCIPLE OF THE INVENTION

The object of the invention is achieved by a vehicle lighting device, in particular by a combined lighting device of a vehicle, whose principle consists in that each light module comprises a driver to which point light sources of this light module are connected, whereby the drivers are connected unit by their data input via a common data-conducting path of the lighting device to a common control and are also connected by their electrical terminals to a two-wire common power distribution system from a power source, whereby each point light source is connected to a power output of its driver and to a negative pole of the power source or to a ground pole.

This device allows you to minimize the number of conductors, electrical and data, to a total of three lines for any configuration of any vehicle lighting device and at the same time allows to use a common power source and a common control device for all the lighting devices of the entire vehicle or only for a group of lighting devices, etc., thereby forming a completely new space for the creation of lighting devices and their control systems while meeting the technical specifications and legal requirements for the use of lighting devices in automotive operation and, in addition, with acceptable financial costs for production, operation and maintenance.

According to a preferred embodiment, the two-wire common power distribution system of the lighting device comprises a first electrically conductive path and a second electrically conductive path, wherein the first electrically conductive path is adapted to be connected to a positive pole of the power source and the second electrically conductive path is adapted to be connected to a negative pole of the power source or to be connected to a grounding pole.

According to one embodiment, the driver comprises a microcontroller which is preceded by a resistor. When using high-power point light sources, it is advantageous if the driver comprises a microcontroller which is preceded by resistor and behind the microcontroller is connected a transistor.

In terms of variability of the arrangement of light modules in the lighting device, it is advantageous if the light modules are separate.

In terms of production and assembly, it is advantageous if at least two light modules are mounted on a common carrier, whereby the two-wire common power distribution system of the lighting device from the source and the common data conducting path are integrated into the common carrier and the common carrier is provided with cathode electrical terminals to be connected to the power source and is further provided with one data terminal to be connected to a common control unit.

From the functional point of view, it is advantageous if the light modules are mounted in at least one housing in desired positions and directions relative to the housing and relative to light output surfaces, whereby each housing is equipped with its own two-wire common power distribution system from the source and with its own common data conducting path to which the light modules are connected and which are further adapted to be connected to the power source and to the common control unit.

The principle of the light module for the vehicle lighting device, especially the combined lighting device for a vehicle, consists in that the light module comprises a driver to whose power output are by its first terminal connected point light sources of the light module, which are by their second terminal connected to the negative pole of electrical energy or to the grounding pole, whereby the driver is provided with a data input to be connected to the control unit and is further provided with electrical terminals to be connected to the two-wire common power distribution system.

In terms of performance and functionality, it is advantageous if the point light sources are formed by LEDs or laser diodes.

In terms of functionality and safety, it is advantageous if the driver comprises a microcontroller and a resistor and, optionally, a transistor is arranged behind the microcontroller.

EXAMPLES OF EMBODIMENT

Figure 1:
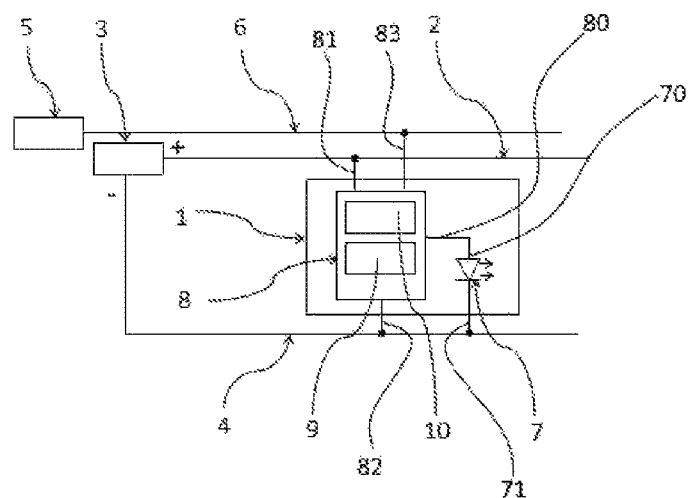
FIG. 1 shows a block diagram of a first exemplary embodiment of a light module with one light source.

The invention will be described with reference to an example of a vehicle lighting device, in particular a combined lighting device of a motor vehicle, which comprises a housing 0, which accommodates individual light modules 1. Each light module 1 comprises a driver 8 (MCU unit) of at least one point light source 7 of the light module 1. Thus, at least one point light source 7 with automotive certification, e.g. an LED or a laser diode or another suitable point light source with automotive certification is connected to the driver 8 in each light module. The point light source 7 is controlled by the driver 8 by switching on and off the power output 80 of the driver 8 to the point light source 7.

The light module 1 or its driver 8 is adapted to be connected to a two-wire (2, 4) common power distribution system from the power source 3 to which is also connected the light module 1 within the lighting device as a whole.

The two-wire common power distribution system of the lighting device comprises a first electrically conductive path 2 and a second electrically conductive path 4. The first electrically conductive path 2 is adapted to be connected to a positive pole (+) of the power source 3. The second electrically conductive path 4 is adapted to be connected to a negative pole (−) of the power source 3, or to be connected to a grounding pole (not shown). The two-wire common power distribution system of the lighting device is realized, for example, by means of electric cables, electrically conductive printed circuits, by means of flexible flat connections, etc.

The light module 1 or, more precisely, its driver 8, is further adapted to be connected to a common data conducting path 6, which is adapted to be connected to a common control unit 5.

The point light source 7 is by its first terminal 70 connected to the power output 80 of the driver 8 of the light module 1 and by its second terminal 71 is connected to the second electrically conductive path 4. If one light module 1 comprises two or more point light sources 7, these point light sources 7 are connected by their first terminal 70 either to one common power output 80 of the driver 8 or each of the point light sources 7 is connected to a separate power output 80 of the driver 8, i.e., the driver 8 has the required number of power outputs 80, or the number of power outputs 80 of the driver 8 is lower than the number of point light sources 7, so that the point light sources 7 are connected to various common or individual power outputs 80 of the driver 8, etc.

FIG. 1 illustrates a block diagram of a first embodiment of the light module 1 for use in the present invention. The light module 1 comprises a driver 8, to whose power output 80 the first terminal 70 of the individual point light source 7 is connected. The driver 8 is by its electrical terminals 81, 82 connected to the first and second electrically conductive paths 2, 4 of the two-wire common power distribution system, its data output 83 it is connected to the common control unit 5 and the point light source 7 is by its second terminal 71 connected to the second electrically conductive path 4 of the two-wire common power distribution system. The driver 8 comprises a microcontroller 9, which is preceded by a resistor 10.

Figure 2:
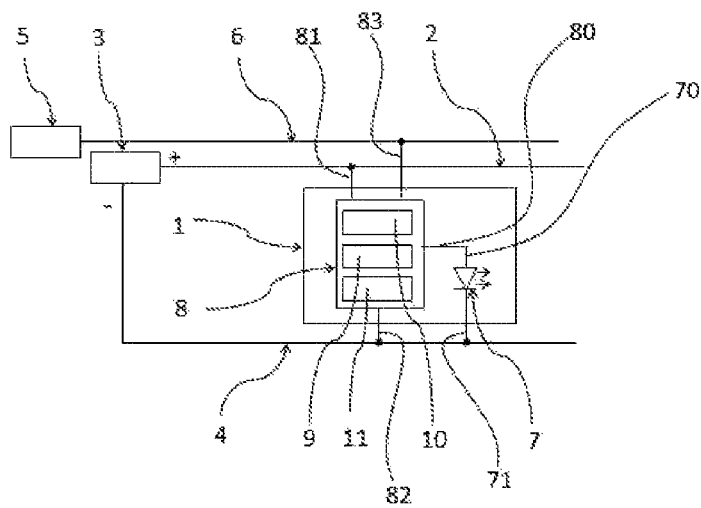
FIG. 2 shows a block diagram of a second exemplary embodiment of the light module with one light source.

FIG. 2 shows a block diagram of a second embodiment of the light module 1 for use in the present invention. The light module 1 comprises a driver 8 to whose power output 80 is connected the first terminal 70 of the individual high-power point light source 7. The driver 8 is by its electrical terminals 81, 82 connected to the first and second electrically conductive path 2, 4 of the two-wire common power distribution system, its data input 83 is connected to the control unit 5 and the point light source 7 is by its second terminal 71 connected to the second electrically conductive path 4 of the two-wire common power distribution system. Due to the high-power point light source 7, the driver 8 has been modified compared to the embodiment in FIG. 1, namely that the resistor 10 and the transistor 11 being disposed behind the microcontroller 9.

Figure 3:
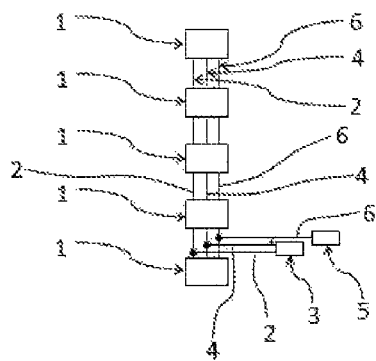
FIG. 3 shows a block diagram of the first exemplary embodiment of the lighting device according to the invention.

FIG. 3 shows a block diagram of one embodiment of using the light modules 1 of FIG. 1 or 2 in the lighting device according to the invention, in which a number of separate light modules 1 are connected to the two-wire common power distribution system of the lighting device from the source 3, i.e. to the first electrically conductive path 2 and to the second electrically conductive path 4, and to the common data-conducting path 6 from the common control unit 5, whereby each of the light modules 1 comprises a driver 8 and at least one point light source 7 and the point light source 7 is by its first terminal 70 connected to the supply output 80 of the driver 8 of the light module 1 and by its second terminal 71 is the point light source 7 connected to the second electrically conductive path 4.

Figure 4:
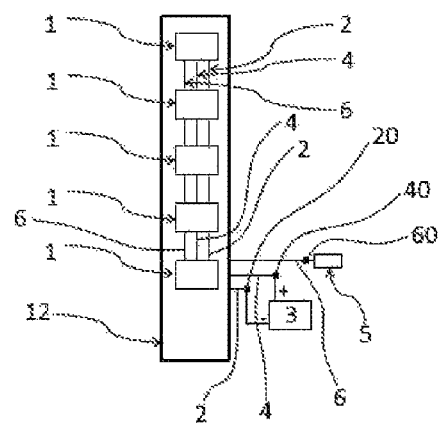
FIG. 4 shows a block diagram of the second exemplary embodiment of the lighting device according to the invention and FIG. 5 shows a block diagram of a third exemplary embodiment of the lighting device according to the invention.

FIG. 4 shows a block diagram of another exemplary embodiment of using the light modules 1 of FIG. 1 or 2 in the lighting device according to the invention, in which the individual light modules 1, each of which comprises a driver 8 and at least one point light source 7, are mounted on a common carrier 12, whereby the two-wire common power distribution system of the lighting device from the source 3, i.e. the first electrically conductive path 2 and the second electrically conductive path 4, as well as the common data conducting path 6 are integrated into a common carrier 12 and this common carrier 12 is provided with one cathode electrical terminal 20 of the first electrically conductive path 2, one anode electrical terminal 40 of the second electrically conductive path 4 and one data terminal 60 of the common data conducting path 6. The cathode electrical terminals 20, 40 are adapted to be connected to the power source 3, whereby the data terminal 60 of the common data conducting path 6 is adapted to be connected to the common control unit 5.

Figure 5:
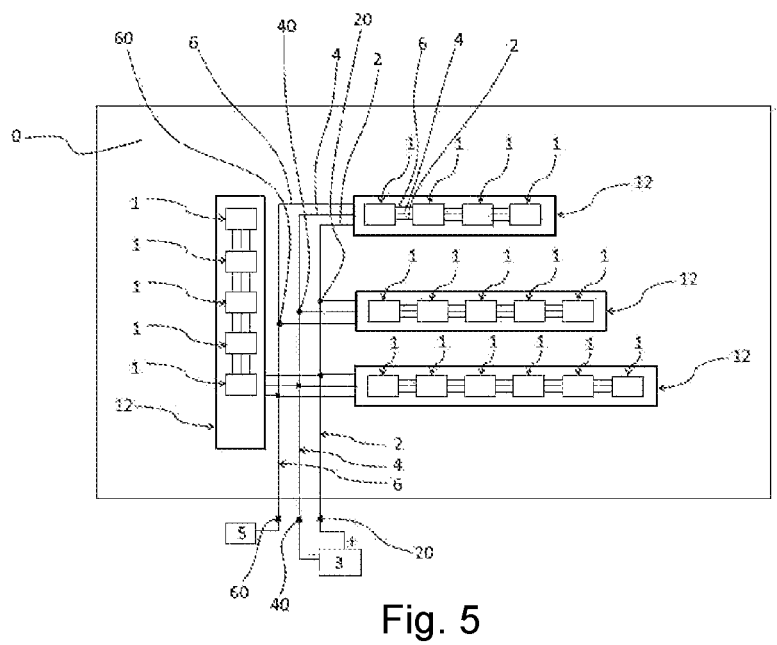

FIG. 5 shows a block diagram of another exemplary embodiment of using the light modules 1 of FIG. 1 or 2 in the lighting device according to the invention, whereby the lighting device comprises a housing 0 in which a plurality of carriers 12 are arranged in desired positions and directions relative to the housing and relative to unillustrated light output surfaces from the housing, each of the carriers 12 being provided with at least one light module 1 with at least one point light source 7. Each carrier 12 is equipped with an integrated two-wire common power distribution system of the lighting device from the source 3 and each carrier 12 is further equipped with an integrated common data conducting path 6. Each carrier 12 is further provided with a cathode electrical terminal 20 of the first electrically conductive path 2, an anode electrical terminal 40 of the second electrically conductive path 4 and a data terminal 60 of the common data conducting path 6. The housing 0 is provided with its own common electrically conductive paths 2, 4, and its own common data conducting path 6, to which the individual carriers 12 with a plurality of light modules 1 are connected by their terminals 20, 40, 60 and which are also adapted to be connected to the power source 3, to the common control unit 5. Each housing 0 thus constitutes an integrated (combined) lighting unit which is connected to the power source 3 and to the common control unit 5, which ensures formation of the required output light function of the lighting device by switching on or off the individual light modules 1 in a controlled manner.

In an unillustrated exemplary embodiment, at least one separate light module 1 with at least one point light source 7 and further also at least one carrier 12 having at least two light modules 1 comprising at least one point light source 7 are mounted in the housing 0 of the lighting device and are connected to electrically conductive paths 2, 4, and to the common data conducting path 6 of the housing 0.

In an unillustrated exemplary embodiment, the lighting device according to the invention comprises at least two housings 0. In each housing 0 is arranged always at least one light module 1 and/or at least one carrier 12 with at least two light modules 1, the light modules 1 comprise at least one point light source 7 and are arranged in the corresponding positions and directions relative to its housing 0 and relative to the unillustrated light output surfaces from the respective housing 0. Each light module 1 and/or each carrier 12 with at least two light modules 1 is connected to a two-wire common power distribution system of the lighting device of the respective housing 0 and to a common data conducting path 6 of the respective housing 0, wherein the two-wire common power distribution system of each housing 0 is connected to a power source 3 and the common data conducting path 6 of each housing 0 is connected to a common control unit 5. Each housing 0 thus constitutes a separate lighting unit which is connected to the common power source 3 and to the common control unit 5, which ensures formation of the required output light function of the lighting device by switching on or off the individual light modules 1 in a controlled manner.

It is evident from the above that the specific possibilities of combining of separate light modules 1 having a different number of point light sources 7 and/or of carriers 12 having a different number of light modules 1 having a different number of point light sources 7 in the housing 0 or housings 0 is entirely within the discretion of the designer of the specific vehicle lighting device, whereby all the light modules 1, whether they are mounted separately or on the carrier 12, can be powered via the two-wire system from one power source 3 and can be controlled via single common data-conducting path 6 by one common control device 5, even within the whole vehicle (all the vehicle lighting devices) or within its subgroups of the vehicle lighting devices (front lighting devices, side lighting devices, rear lighting devices etc.).

LIST OF REFERENCES

0 lighting device housing
1 light module
2 first electrically conductive path
20 cathode electrical terminal of the first electrically conductive path
3 power source
4 second electrically conductive path
40 cathode electrical terminal of the second electrically conductive path
5 control unit
6 common data conducting path
60 data output of the common data-conducting path
7 point light source
70 first terminal of the point light source
71 second terminal of the point light source
8 driver
80 power output of the driver
81 electrical terminal of the driver
82 electrical terminal of the driver
9 microcontroller
10 resistor
11 transistor
12 carrier

The invention claimed is:

1. A vehicle lighting device, in particular a vehicle combined lighting device, comprising at least two controllable light modules with point light sources with automotive certification, which are connected to a power source and to a control unit, wherein each light module comprises a driver, to which point light sources of this light module are connected, whereby the drivers are connected by their data input via a common data-conducting path of the lighting device to a common control unit and are further connected by their electrical terminals to two-wire common power distribution system from the source of electrical energy, whereby each point light source is connected to a power output of its driver and to a negative pole of the source of electrical energy or to a ground pole.

2. The vehicle lighting device according to claim 1, wherein the two-wire common power distribution system of the lighting device comprises a first electrically conductive path and a second electrically conductive path, wherein the first electrically conductive path is adapted to be connected to the positive pole of the source of electrical energy and the second electrically conductive path is adapted to be connected to the negative pole of the source of electrical energy or to be connected to the ground pole.

3. The vehicle lighting device according to claim 1, wherein the driver comprises a microcontroller, which is preceded by a resistor.

4. The vehicle lighting device according to claim 1, wherein the driver comprises a microcontroller, which is preceded by a resistor, and behind the microcontroller is arranged a transistor.

5. The vehicle lighting device according to claim 1, wherein the light modules are separate.

6. The vehicle lighting device according to claim 1, wherein at least two light modules are mounted on a common carrier, whereby a two-wire common power distribution system of the lighting device from the source and a common data conducting path are integrated into the common carrier and this common carrier is provided with cathode electrical terminals to be connected to the source of electrical energy and is further provided with one data terminal to be connected to the common control unit.

7. The vehicle lighting device according to claim 1, wherein the light modules are accommodated in desired positions and directions relative to the housing and relative to the light output surfaces from the housing in at least one housing, whereby each housing is equipped with its own two-wire common power distribution system from the source and its own common data conducting path, to which are connected the light modules and which are further adapted to be connected to the source of electrical energy and to the common control unit.

8. A light module for a vehicle lighting device, in particular for a vehicle combined lighting device, comprising at least one point source with automotive certification and connected to a source of electrical energy and to a control unit, wherein the light module comprises a driver, to whose power output are connected the point light sources of the module by their first terminals, the point light sources of the module being by their other terminal connected to a negative pole of the source of electrical energy or to the ground pole, whereby the driver is provided with data input to be connected to control unit and is further provided with electrical terminals to be connected to a two-wire common power distribution system.

9. The light module according to claim 8, wherein the point light sources are formed by LEDs or laser diodes.

10. The light module according to claim 8, wherein the driver comprises a microcontroller, which is preceded by a resistor and optionally a transistor is arranged behind the microcontroller.

* * * * *